(12) United States Patent
Bartlett et al.

(10) Patent No.: US 11,693,096 B2
(45) Date of Patent: Jul. 4, 2023

(54) LIDAR WITH PHASE LIGHT MODULATOR

(71) Applicant: Texas Instruments Incorporated, Dallas, TX (US)

(72) Inventors: Terry Alan Bartlett, Dallas, TX (US); John Peter Fenske, Richardson, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 477 days.

(21) Appl. No.: 16/808,457

(22) Filed: Mar. 4, 2020

(65) Prior Publication Data
US 2020/0284880 A1 Sep. 10, 2020

Related U.S. Application Data

(60) Provisional application No. 62/815,090, filed on Mar. 7, 2019.

(51) Int. Cl.
G01S 7/481 (2006.01)
G02F 1/137 (2006.01)
G02B 27/30 (2006.01)
G02B 26/06 (2006.01)

(52) U.S. Cl.
CPC .......... *G01S 7/4815* (2013.01); *G01S 7/4816* (2013.01); *G02B 26/06* (2013.01); *G02B 27/30* (2013.01); *G02F 1/137* (2013.01); *G02F 2203/50* (2013.01)

(58) Field of Classification Search
CPC ..... G01S 7/4815; G01S 7/4816; G02B 26/06; G02B 27/30; G02F 1/137; G02F 2203/50
See application file for complete search history.

(56) References Cited

U.S. PATENT DOCUMENTS

| 4,678,852 | A | 7/1987 | Punzar et al. |
| 2007/0181810 | A1* | 8/2007 | Tan ........................ G01S 7/4811 250/341.1 |
| 2017/0357000 | A1* | 12/2017 | Bartlett ................. G01S 7/4816 |

FOREIGN PATENT DOCUMENTS

| WO | 2013144648 A1 | 10/2013 |
| WO | WO-2018161203 A1 * | 9/2018 ............. G01S 17/42 |

OTHER PUBLICATIONS

International Search Report dated Jun. 4, 2020, PCT Application No. PCT/US2020/021720, 2 pages.

(Continued)

*Primary Examiner* — Nathanael R Briggs
(74) *Attorney, Agent, or Firm* — Michelle F. Murray; Frank D. Cimino

(57) ABSTRACT

Described examples include an apparatus having a phase light modulator. The apparatus also has a first light source configured to direct a first light beam to the phase light modulator, the phase light modulator configured to provide a first modulated light beam directed to a first field of view. The apparatus also has a second light source configured to direct a second light beam to the phase light modulator, the phase light modulator configured to provide a second modulated light beam directed to a second field of view. The apparatus also has a first light detector configured to detect the first modulated light beam as reflected from the first field of view; and a second light detector configured to detect the second modulated light beam as reflected from the second field of view.

22 Claims, 8 Drawing Sheets

(56) References Cited

OTHER PUBLICATIONS

Writtenion Opinionn dated Jun. 4, 2020, PCT Application No. PCT/US2020/021720, 4 pages.
McManamon et al., Optical Phased Array Technology, Proc. of the IEEE, vol. 84, No. 2, pp. 269-298 (Feb. 1996) IEEE, 3 Park Avenue, 17th Floor New York, NY 10016-5997 USA.
Makowski et al., "Simple Holographic Projection in Color," Opt. Express 20, 22 (Oct. 2012) Optics Express, OSA—The Optical Society, 2010 Massachusetts Ave., N.W., Washington, D.C. 20036-1012 USA.
Maimone et al., "Holographic Near-Eye Displays for Virtual and Augmented Reality," ACM Transactions on Graphics, vol. 36, No. 4, Article 85 (Jul. 2017) https://doi.org/10.1145/3072959.3073624 Association for Computing Machinery, 1601 Broadway, 10th Floor, New York, NY 10019-7434.
Bartlett et al., "Adapting Texas Instruments DLP technology to demonstrate a phase spatial light modulator," Proc. SPIE 10932, Emerging Digital Micromirror Device Based Systems and Applications XI, 109320S (Mar. 4, 2019) doi: 10.1117/12.2514483 SPIE, 1000 20th St., Bellingham WA 98225-6705 USA.

\* cited by examiner

LIDAR WITH PHASE LIGHT MODULATOR

CROSS-REFERENCE TO RELATED APPLICATIONS

This application claims the benefit under 35 U.S.C. § 119(e) to co-owned U.S. Provisional Patent Application Ser. No. 62/815,090, filed Mar. 7, 2019, which is hereby incorporated by reference in its entirety herein.

TECHNICAL FIELD

This relates generally to ranging devices, and in particular to ranging and imaging devices using light.

BACKGROUND

Light detection and ranging (LIDAR) systems detect and determine the position of objects. In one example, a light beam is projected to a known position in a field of view. A light detector is focused on that position in the field of view and detects any reflection of the light from an object that may be in the field of view. The time the light travels is used to help determine the distance of the object. By scanning the light beam across the field, the position of objects in the field and an image of the objects can be determined.

A challenge with scanning-type LIDAR systems is scanning rapidly and accurately enough to capture movement of objects within the field. For example, in automotive applications, the LIDAR system must rapidly and accurately determine the movement of pedestrians and vehicles, as well as other objects. Mirrors have been applied to scan the beams. Other examples use gimbal mounts to move the entire light projection and detection system as one unit. However, it is difficult to operate these mechanical systems with sufficient accuracy. In addition, such systems are often bulky, have large power requirements, and require frequent maintenance and calibration to maintain accuracy.

SUMMARY

In accordance with a described example, an apparatus includes a phase light modulator. The apparatus also includes a first light source optically coupled to the phase light modulator, the first light source configured to generate a first light beam and positioned to direct the first light beam to the phase light modulator at a first angle of incidence, the phase light modulator configured modulate the first light beam to provide a first modulated light beam and to direct the first modulated light beam to a first field of view responsive to the first light beam; and a second light source optically coupled to the phase light modulator, the second light source configured to generate a second light beam and positioned to direct the second light beam to the phase light modulator at a second angle of incidence, the phase light modulator configured modulate the second light beam to provide a second modulated light beam and to direct the second modulated light beam to a second field of view responsive to the second light beam. The apparatus also includes a first light detector optically coupled to the first field of view and configured to detect the first modulated light beam as reflected from the first field of view and a second light detector optically coupled to the second field of view and configured to detect the second modulated light beam as reflected from the second field of view.

DETAILED DESCRIPTION

Figure 1A:
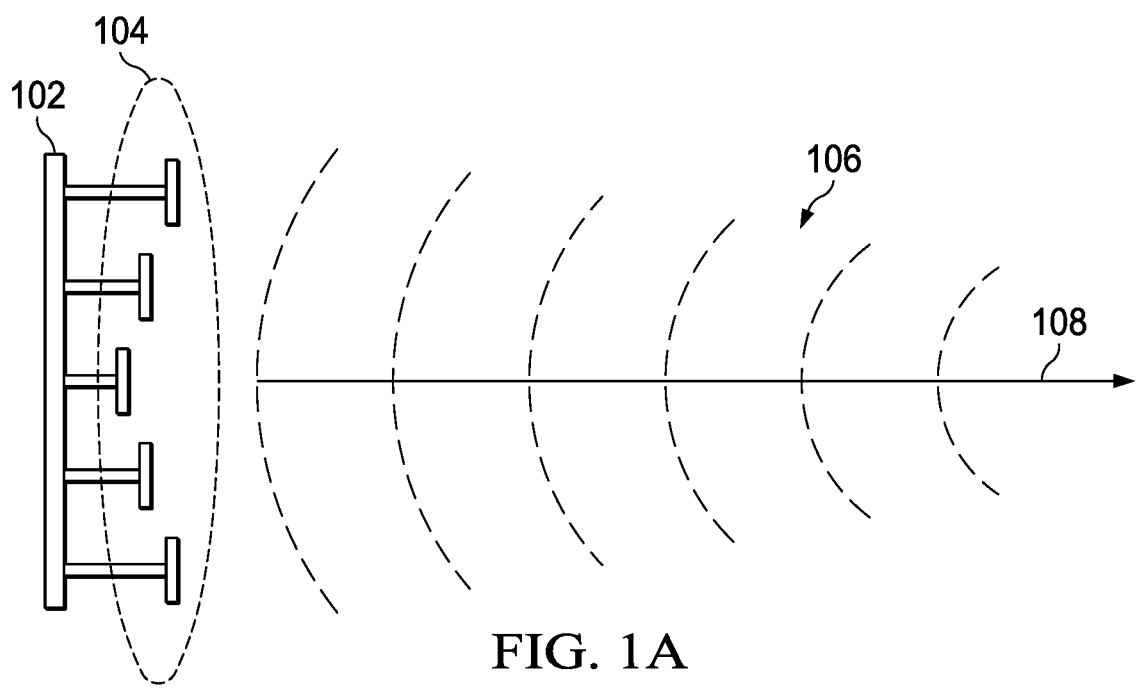
FIGS. 1A and 1B (collectively "FIG. 1) are diagrams illustrating light steering using phase light modulators (PLMs).

In the drawings, corresponding numerals and symbols generally refer to corresponding parts unless otherwise indicated. The drawings are not necessarily drawn to scale.

In this description, the term "coupled" may include connections made with intervening elements, and additional elements and various connections may exist between any elements that are "coupled." Elements referred to herein as "optically coupled" are elements that include a connection between the elements that involves transmission of light. Also as used herein, a "phase light modulator" (PLM) is a device with a plurality of pixels, wherein the PLM may modify the phase of light applied to each pixel. The PLM may reflect or transmit the applied light. The interference of the light from the phase modified pixels and/or phase unmodified pixels modulates the applied light.

In example arrangements, the problems of slow scan rates and a narrow field of view (FOV) for a phase light modulator (PLM) steered light source are solved by providing at least two light sources to a PLM such that the light from each light source scans a different FOV contemporaneously. In at least one example, the LIDAR apparatus has a single PLM device used for at least two light sources. The light sources have different angular orientations relative to the PLM. Because of the different angular orientations, each laser illuminates a point in a respective field of view (FOV), and all FOVs are scanned contemporaneously and tiled together. In accordance with an example, an apparatus includes a phase light modulator. The apparatus also includes a first light source optically coupled to the phase light modulator, the first light source configured to generate a first light beam and positioned to direct the first light beam to the phase light modulator at a first angle of incidence, the phase light modulator configured modulate the first light beam to provide a first modulated light beam and to direct the first modulated light beam to a first field of view responsive to the first light beam; and a second light source optically coupled to the phase light modulator, the second light source configured to generate a second light beam and positioned to direct the second light beam to the phase light modulator at a second angle of incidence, the phase light modulator configured modulate the second light beam to provide a second modulated light beam and to direct the second modulated light beam to a second field of view responsive to the second light beam. The apparatus also includes a first light detector optically coupled to the first field of view and configured to detect the first modulated light beam as reflected from the first field of view and a second light detector optically coupled to the second field of view and configured to detect the second modulated light beam as reflected from the second field of view.

An example PLM is a digital micromirror based PLM. This type of PLM device includes a number of digital micromirrors on the surface of a substrate. In examples, this type of PLM may include hundreds of thousands of micromirrors or more than a million micromirrors. Each micromirror is designed so that its vertical position above the substrate can be precisely positioned using electrostatic force applied to the micromirror by driving circuitry in the substrate. The phase of light reflected from a particular micromirror is determined by the vertical position of the micromirror (vertical with respect to the substrate, which is horizontal for this discussion). For example, if a first micromirror is a its full height above the substrate and an adjacent second micromirror is lowered one fourth of a wavelength, the light reflected from the second micromirror travels one-half wavelength (one quarter wavelength down plus one quarter wavelength up) relative to light reflected from the first micromirror. The light reflected from the first and second micromirrors will then interfere in a predictable manner. The pattern of phase changes on a PLM may be selected to provide a desired diffraction-like effect, such as steering or focusing the light. See, e.g. McManamon et al., "Optical Phased Array Technology, Proc. of the IEEE, Vol. 84, No. 2, pp 269-298 (February 1996), which is hereby incorporated by reference herein in its entirety. Arbitrary patterns such as spots or beams can be created at a desired distance in the field of view. Another example PLM is a liquid crystal type phase light modulator. With this type of PLM, a voltage applied at each pixel alters the liquid crystal at that pixel to cause a phase shift of the light. Liquid crystal PLMs may be transmissive or reflective.

Figure 1B:
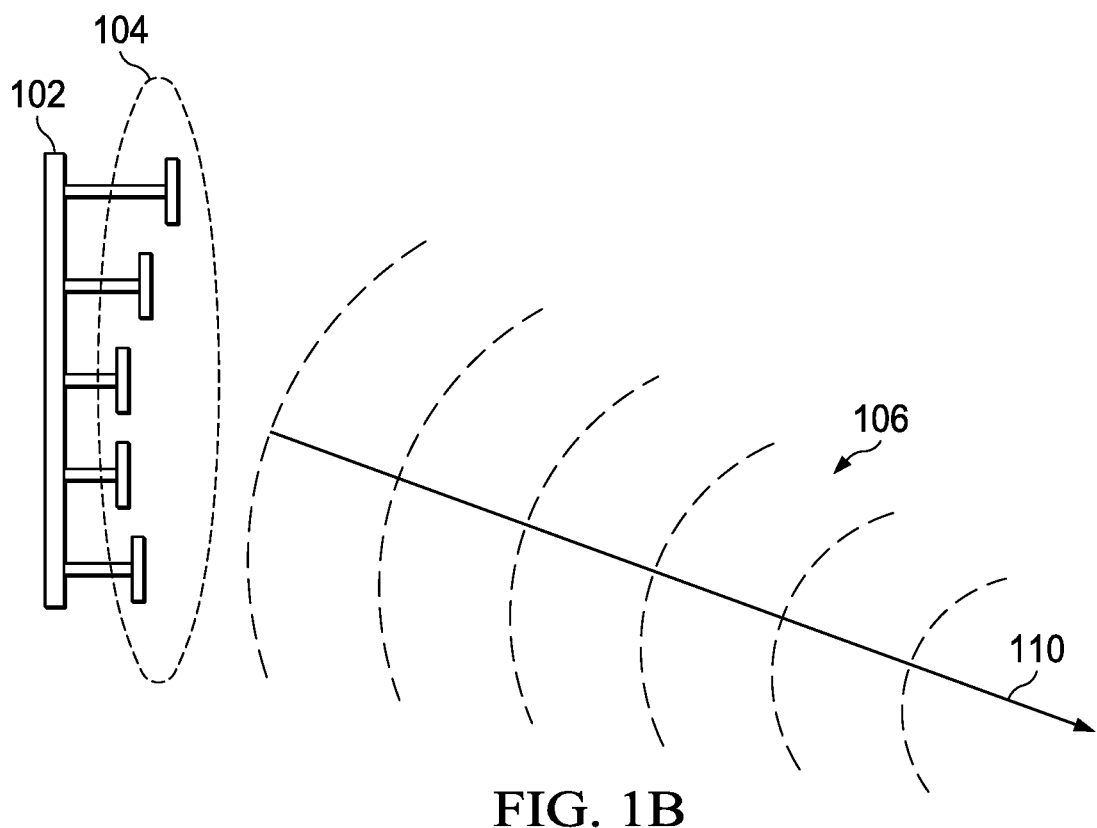

FIGS. 1A and 1B (collectively "FIG. 1") are diagrams illustrating light steering using PLMs. In this example, PLM 102 is a digital micromirror based PLM. In FIG. 1A, micromirrors 104 of PLM 102 have a steering pattern selected to direct light 106 in direction 108. In FIG. 1B, micromirrors 104 have a pattern selected to direct light 106 in a direction 110. Thus, PLM 102 can steer light in a desired direction. In addition to steering the light, PLM 102 can focus the light at a spot (focal point) at a desired distance.

Figure 2:
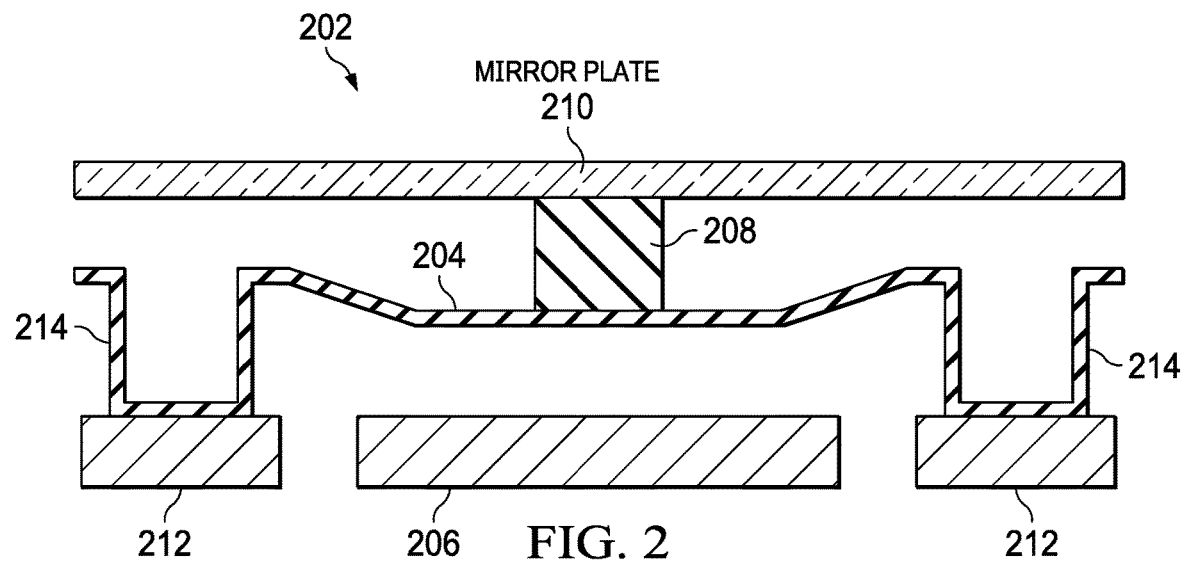
FIG. 2 is a side view of an example micromirror.

FIG. 2 is a side view of an example micromirror like one of micromirrors 104 (FIG. 1). Platform 204 connects to two platform electrodes 212 via platform posts 214. Post 208 supports mirror 210 above platform 204. As shown in FIG. 2, when a voltage is applied to driving electrode 206 and a reference voltage (e.g. ground) is applied to platform electrodes 212, an electrostatic force pulls platform 204, and thus mirror 210, down. The amount of movement is determined by the applied voltage. In other examples, pixel 202 uses two or more driving electrodes 206 that are individually addressable by driving circuitry (not shown). The applied electrostatic force is proportional to the area of a driving electrodes 206 and platform 204. Thus, using multiple electrodes the amount of force, and thus the vertical position of mirror 210 can be precisely controlled by selecting the driving electrode 206 or combination of driving electrodes 206, while applying the same voltage to each selected one of driving electrodes 206. The phase shift provided by pixel 202 is determined by the vertical positioning of mirror 210. For example, if a pixel lowers by one-quarter wavelength (¼λ), light reflected from that pixel will travel an additional one-half wavelength (¼λ down to the mirror and ¼λ back) relative to a pixel that is not lowered. In another example, if a pixel lowers by one-eighth wavelength (⅛λ), light reflected from that pixel will travel an additional one-quarter wavelength (⅛λ down to the mirror and ⅛λ back) relative to a pixel that is not lowered.

Figure 3:
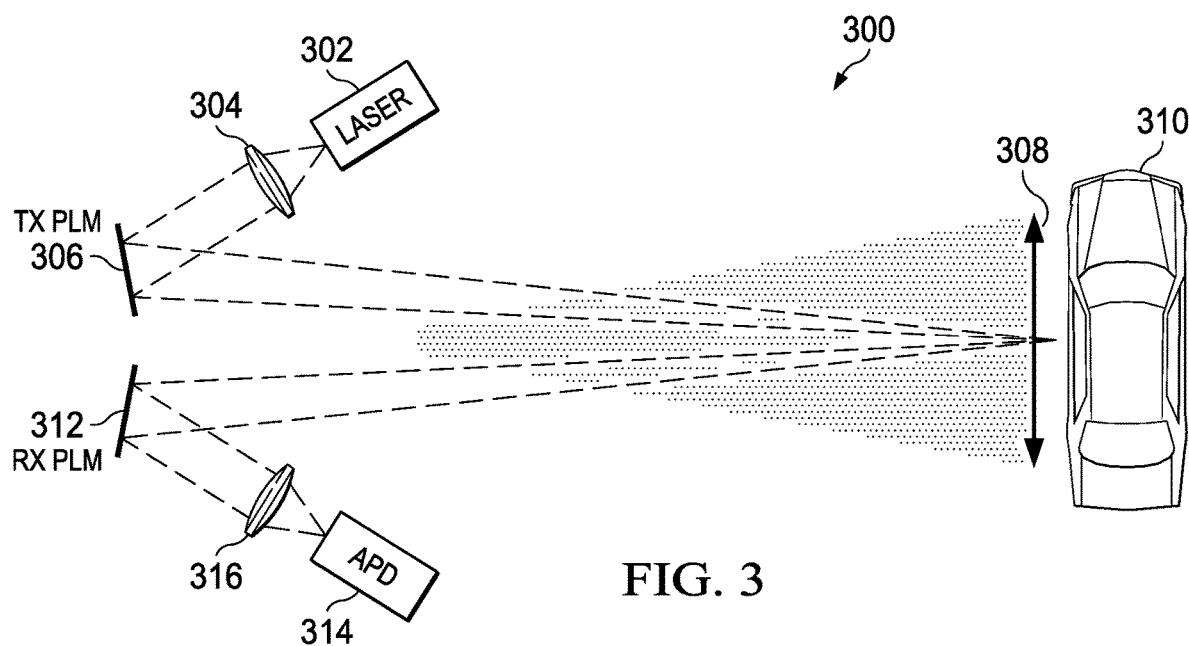
FIG. 3 is a top view of an example LIDAR apparatus.

FIG. 3 is a top view of an example LIDAR apparatus 300. Light source 302 is a laser in this example. In an example, light source 302 provides near infrared laser light. Light source 302 provides light through collimating lens 304 to transmit PLM 306. Transmit PLM 306 provides a configurable phase pattern to the light that directs the light to target 308. In the example of FIG. 3, target 308 is on the surface of an object 310, which is an automobile. Light reflected from object 310 is focused by receive PLM 312 to detector 314 through lens 316. Because the point at which the light is directed by transmit PLM 306 is known, detection of reflected light by detector 314 indicates that an object is at that point. In this example, detector 314 is an avalanche photo diode. Transmit PLM 306 scans the field of view while receive PLM 312 scans the field of view seen by the APD to match the target 308 to which transmit PLM is scanning. This allows example LIDAR apparatus 300 to determine the distance and contour of object 310.

LIDAR apparatus 300 has limitations. For example, each pattern on the PLM corresponds to steering the light beam in a particular direction. A significant amount of time is required for the transmit PLM 306 and receive PLM 312 to change from one pattern to another. For example, if a new pattern's data load time is 50 μs, and the frame time is 100 ms, then only 2,000 points can be captured, which is a resolution of only ~65×30. A higher resolution is preferable. In addition, LIDAR scanning of large field-of-view (FOV) is difficult. Scanning an area larger than 60×20 degrees a with 0.1 degree beam width, 10 Hz frame rate requires a PLM update rate of greater than 1 million samples/second. However, the size of the mirrors in the PLM limits the field of view and the wavelength of the light limit the FOV. For a pixel size of about 10μ square using near infrared light, the FOV of current PLM devices is limited to just a few degrees. Receive PLM 312 allows rejection of ambient light by directing light from a narrow angle to the detector. However, scanning a large FOV requires wide-angle optics. Wide angle optics require a small aperture size that limits the signal strength received at detector 314.

Figure 4A:
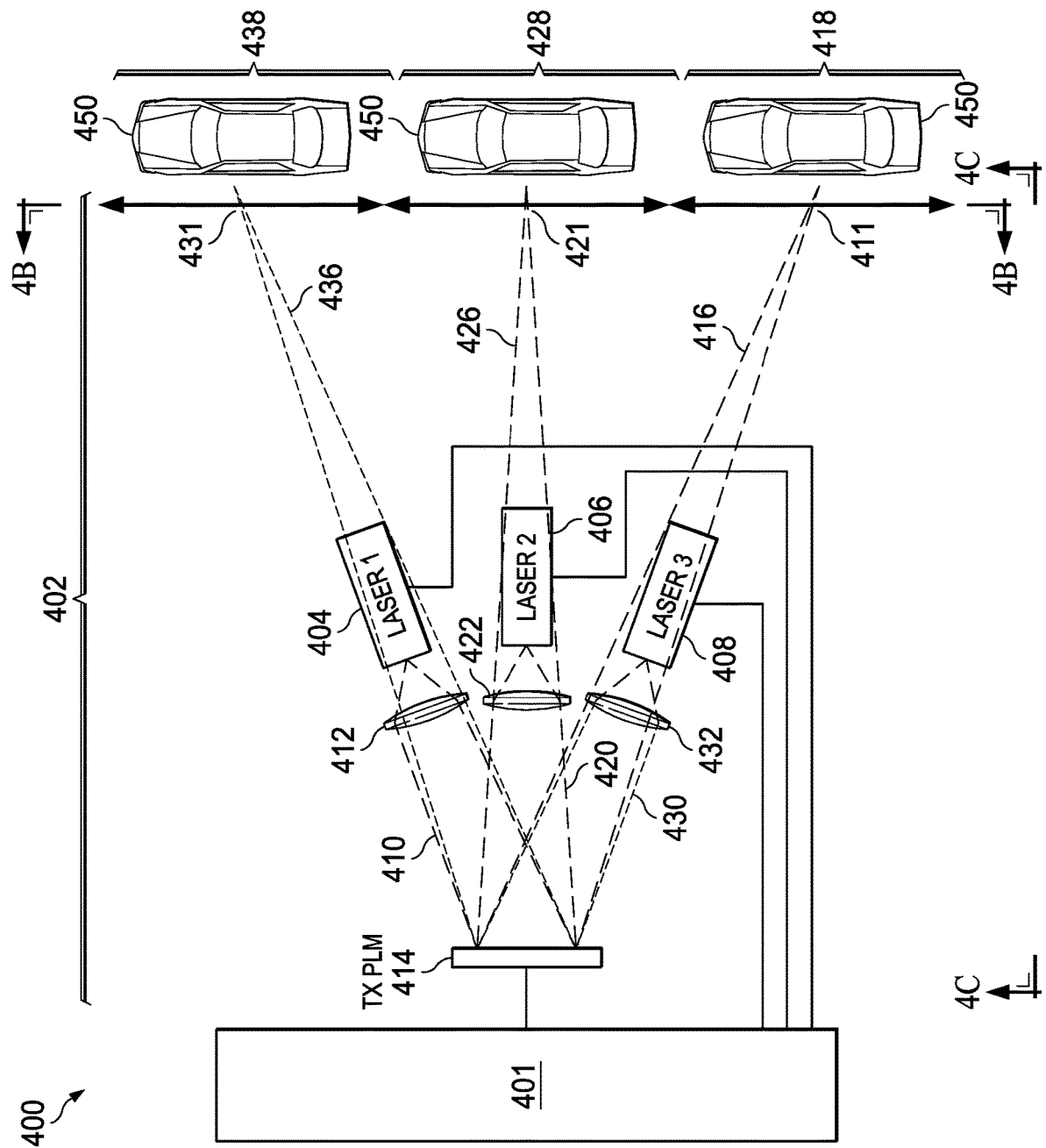
FIGS. 4A-D (collectively "FIG. 4") are views of a transmit portion of an example LIDAR apparatus and a scanning pattern used with the LIDAR apparatus.

FIGS. 4A-D (collectively "FIG. 4") are views of a transmit portion 402 of an example LIDAR apparatus 400. FIG. 4A is a top view of transmit portion 402. As used herein, the terms "top view" and "side view" indicate the relative orientation of the figures and do not denote any other relationship. For example, the "top" or "side" of LIDAR apparatus 400 may be in any of a number of orientations in a particular installation of example LIDAR apparatus 400. Example LIDAR apparatus 400 includes three light sources: first light source 404, second light source 406 and third light source 408. Controller 401 controls the light output of first light source 404, second light source 406 and third light source 408. Example LIDAR apparatus 400 includes three light sources in this example but may include two, four, or more light sources, which may be arranged in a one-dimensional or two-dimensional array. In addition, in this example, first light source 404, second light source 406 and third light source 408 are near-infrared laser diodes but may be other types of light sources, such ultraviolet light sources. First light source 404 provides first light beam 410 through first collimating lens 412 at a first angle of incidence relative to transmit PLM 414. Transmit PLM 414 is a digital micromirror based PLM in this example. In other examples, transmit PLM 414 is a reflective or transmissive liquid crystal phase light modulator. In accordance with a steering pattern applied to transmit PLM 414 by controller 401, the first output of transmit PLM 414 in response to first light beam 410 is first modulated light beam 416 having a first output angle of reflection. The first angle of incidence of first light source 404 and the steering pattern on transmit PLM 414 determine the output angle of reflection to the first focal point 411. In this example, the first angle of incidence directs first modulated light beam 416 to a first focal point 411 on object 450 in first field of view (FOV) 418.

Second light source 406 provides second light beam 420 through second collimating lens 422 at a second angle of incidence relative to transmit PLM 414. In accordance with a steering pattern applied to transmit PLM 414 by controller 401, the output of transmit PLM 414 in response to second light beam 420 is second modulated light beam 426 having a second angle of reflection. At any given time, the steering pattern on transmit PLM 414 is constant. Therefore, the difference between the second angle of reflection and the first angle of reflection is determined by the difference between the second angle of incidence and the first angle of incidence. As with the first angle of reflection, the second angle of reflection of second light source 406 and the pattern on transmit PLM 414 determine the second angle of reflection. In this example, the second angle of reflection directs second modulated light beam 426 to a second focal point 421 on object 450 in second FOV 428.

Third light source 408 provides third light beam 430 through third collimating lens 432 at a third angle of incidence relative to transmit PLM 414. In accordance with a steering pattern applied to transmit PLM 414 by controller 401, the output of transmit PLM 414 in response to third light beam 430 is third modulated light beam 436 having a third angle of reflection. At any given time, the steering pattern on transmit PLM 414 is constant. Therefore, the difference between the third angle of reflection and the first and second angles of reflection is determined by the difference between the third angle of incidence and the first and second angles of incidence. As with the first and second angles of reflection, the third angle of incidence of third light source 408 and the pattern on transmit PLM 414 determine third angle of reflection. In this example, the third angle of reflection directs third modulated light beam 436 to a third focal point 431 on object 450 in third FOV 438. In summary, transmit PLM 414 contemporaneously directs light from first light source 404, second light source 406 and third light source 408 to points in first FOV 418, second FOV 428 and third FOV 438, respectively.

Figure 4B:
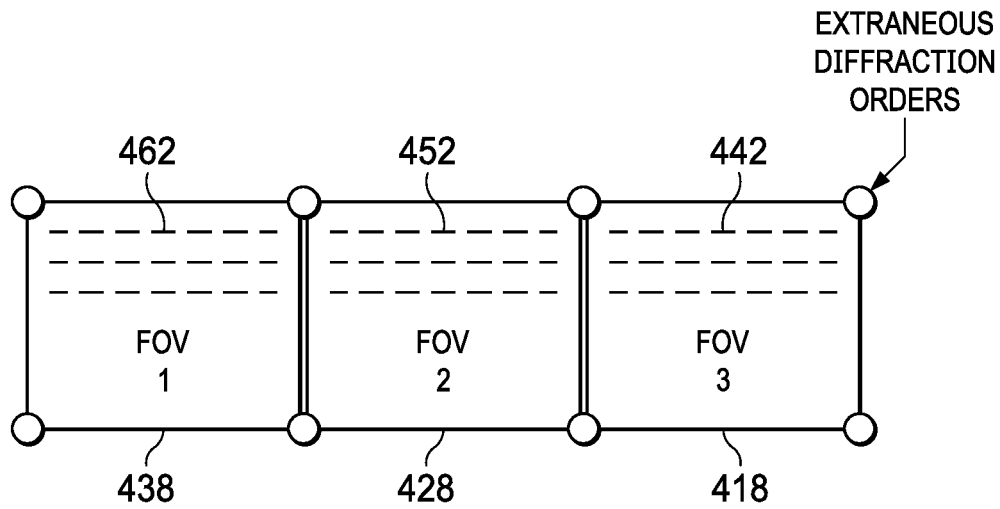

FIG. 4B is a view of the fields of view as shown by view line 4B-4B of FIG. 4A. FIG. 4B is a view from the perspective of transmit PLM 414 facing first FOV 418, second FOV 428 and third FOV 438. For a given steering pattern on transmit PLM 414, first light source 404, second light source 406 and third light source 408 illuminate one point in each of first FOV 418, second FOV 428 and third FOV 438, respectively. By changing the steering pattern of transmit PLM 414, transmit portion 402 scans each FOV. In this example, first scanning points 442, second scanning points 452 and third scanning points 462 are scanned in a raster scan manner, as illustrated in FIG. 4B. However, other scanning methods may be used such as random scanning. As shown in FIG. 4B, in this example, the size of first FOV 418, second FOV 428 and third FOV 438 is selected so that first FOV 418, second FOV 428 and third FOV 438 avoid extraneous diffraction orders produced by light diffracting from the steering pattern on transmit PLM 414. In other examples, the FOVs overlap to provide more accurate, but slower, scanning. In these examples, any extraneous diffraction orders must be corrected after detection.

Figure 4C:
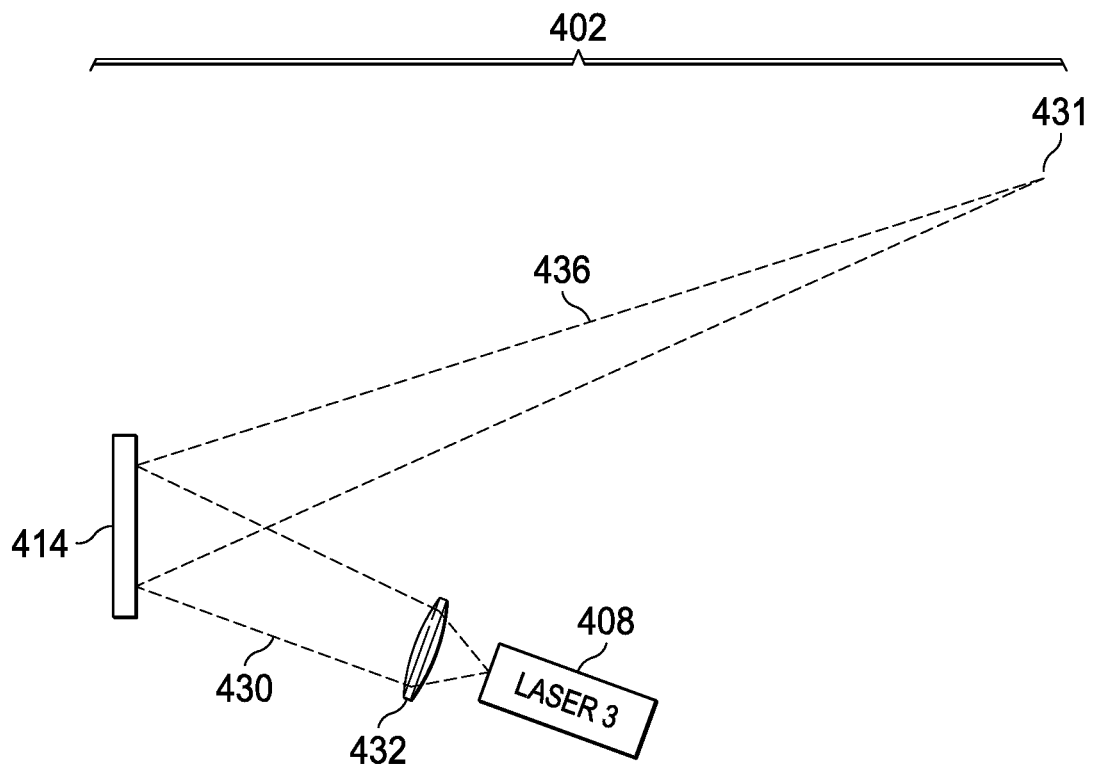

FIG. 4C is side view of transmit portion 402 of example LIDAR apparatus 400. FIG. 4C is a view looking across the face of transmit PLM 414 from the direction of third light source 408, which is from view 4C-4C of FIG. 4A. Third light source 408 blocks the view of first light source 404 and second light source 406 from this perspective. In addition, third collimating lens 432 blocks the view of first collimating lens 412 and second collimating lens 422. For simplicity, only third light beam 430 and third modulated light beam 436 are shown in FIG. 4C. As can be seen from FIG. 4C, third light beam 430 and third modulated light beam 436 are not in the same plane. In this example, this avoids interference of third light source 408 with third modulated light beam 436. A specific configuration of light sources is shown in this example vis-a-vis transmit PLM 414. Other examples may use different configurations. In addition, other examples may use two, four or more light sources.

Figure 4D:
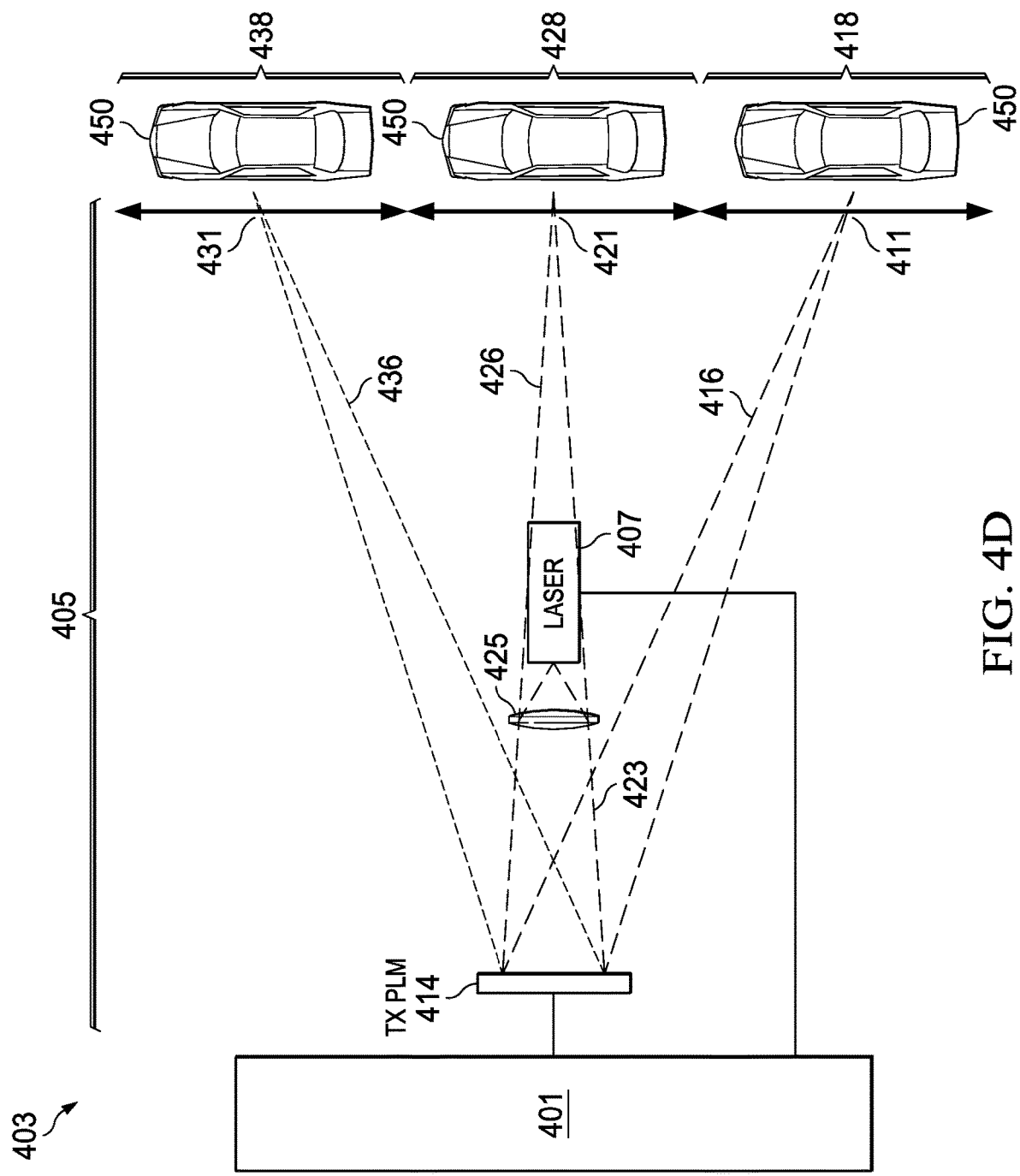

FIG. 4D is a top view of another example transmit portion 405 of another example LIDAR apparatus 403. In this example apparatus, one light source 407 produces first modulated light beam 416, second modulated light beam 426 and third modulated light beam 436. Light source 407 provides light beam 423 through collimating lens 425. Transmit PLM 414 in this example does not use a single steering pattern, but rather uses three steering patterns. In an example, three different steering patterns would be applied to three different portions of transmit PLM 414. Three steering patterns are used in this example. However, two, four or more steering patterns may be used. In addition, the example of FIG. 4D includes one light source at one angle of incidence. However, using multiple light sources at multiple angles of incidence along with multiple steering patterns applied to transmit PLM 414 multiplies the number of fields of view that can be illuminated contemporaneously. For example, three light sources applied to a transmit PLM having three steering patterns can illuminated nine fields of view contemporaneously.

In the example of FIG. 4D, three steering patterns applied to transmit PLM 414 produce light first modulated light beam 416, second modulated light beam 426 and third modulated light beam 436, which illuminate object 450 at first focal point 411, second focal point 421 and third focal point 431, respectively, in first FOV 418, second FOV 428 and third FOV 438, respectively. The steering pattern scans the fields of view as described above with regard to FIGS. 4A and 4B. The example of FIG. 4D limits the amount of light provided to each focal point to one-third or less of the luminance provided by light source 407 because each steering pattern is applied to one-third or less of the area of transmit PLM 414.

Figure 5A:
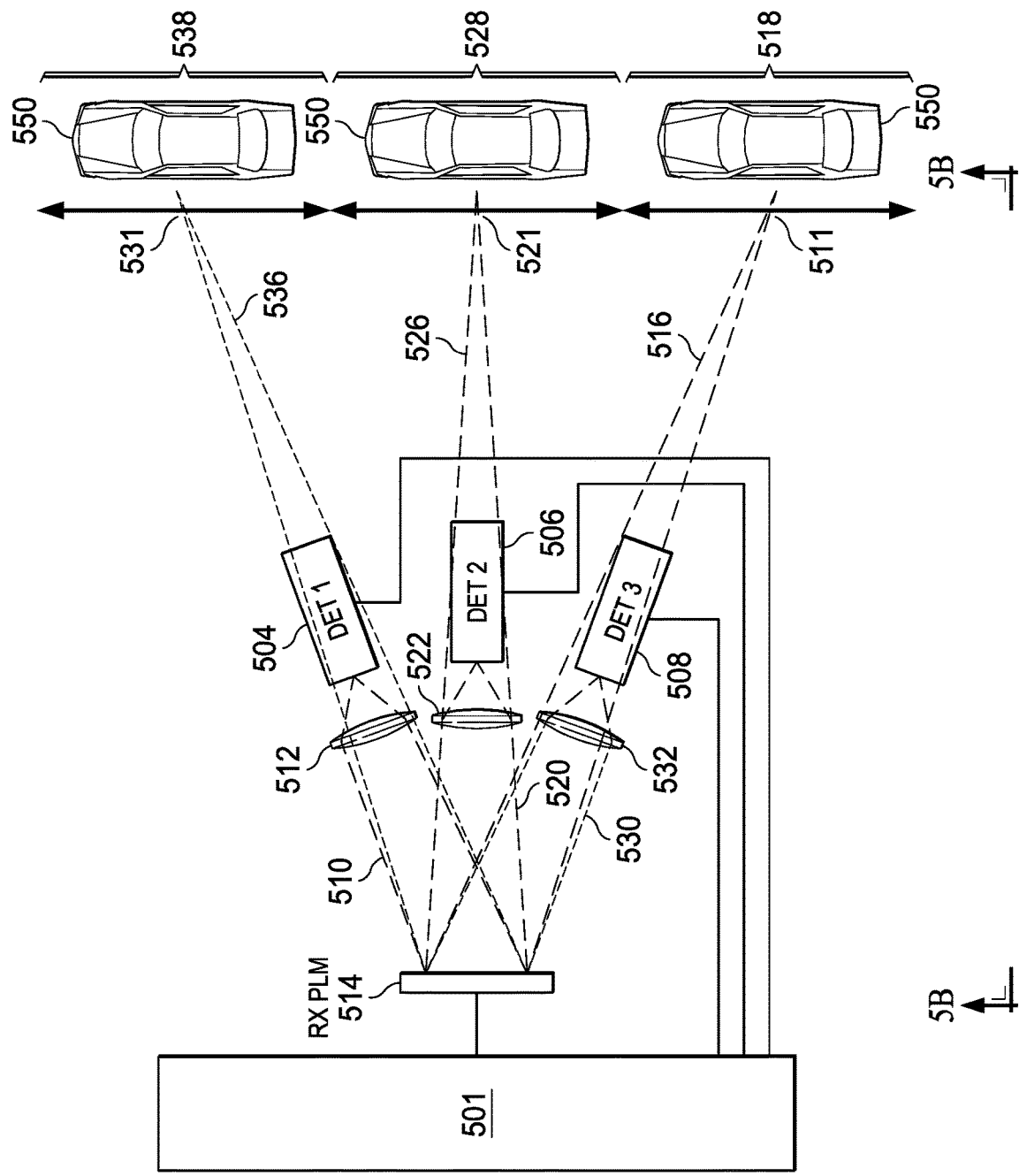
FIGS. 5A and 5B (collectively "FIG. 5") are views of a receive portion of the LIDAR apparatus of FIG. 4.
Figure 5B:
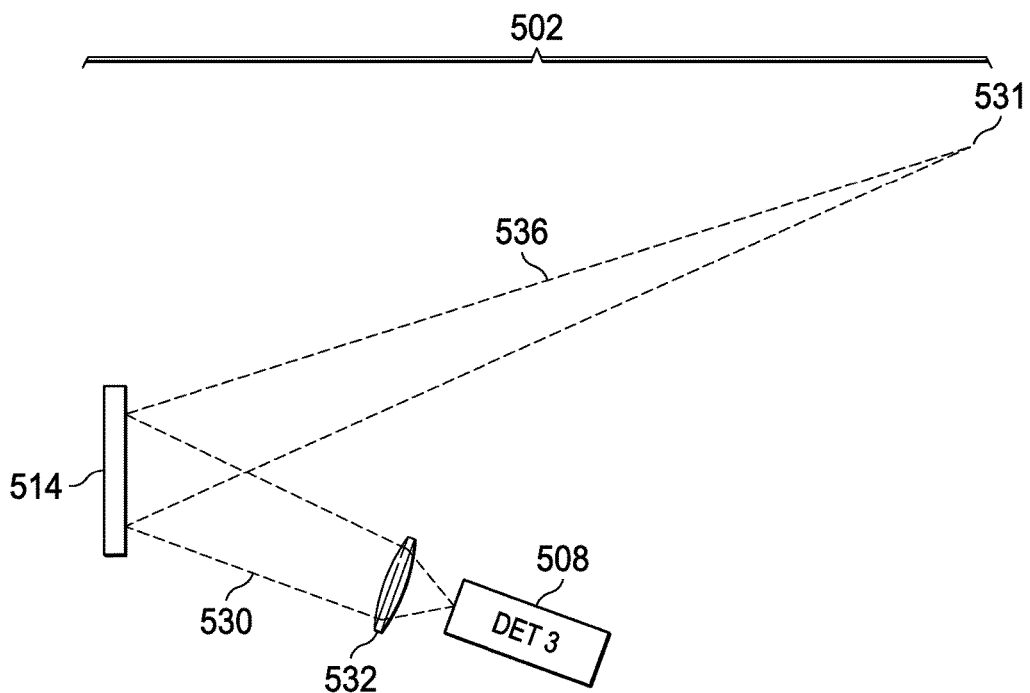

FIGS. 5A and 5B (collectively "FIG. 5") are views of a receive portion 502 of example LIDAR apparatus 400 (FIG. 4). FIG. 5A shows a top view of receive portion 502. Controller 501 is like controller 401 (FIG. 4). First detector 504, second detector 506 and third detector 508 detect light reflecting off an object in first FOV 518, second FOV 528 and third FOV 538, respectively. First FOV 518, second FOV 528 and third FOV 538 correspond to first FOV 418, second FOV 428 and third FOV 438 (FIG. 4). First focal point 511, second focal point 521 and third focal point 531 correspond to first focal point 411, second focal point 421 and third focal point 431 (FIG. 4), respectively. First detector 504 detects first focal point 511 in first FOV 518 illuminated by first light source 404 (FIG. 4). Second detector 506 detects second focal point 521 in second FOV 528 illuminated by second light source 406 (FIG. 4). Third detector 508 detects third focal point 531 in third FOV 538 illuminated by third light source 408 (FIG. 4). Object 550 corresponds to object 450 (FIG. 4)

Receive PLM 514 focuses first reflected light beam 516 reflected from object 550 at a first focal point 511 in first FOV 518 as first received light beam 510 onto first detector 504 through first receiving lens 512. Receive PLM 514 is a digital micromirror based PLM in this example. In other examples, receive PLM 514 is a reflective or transmissive liquid crystal phase light modulator. Controller 501 receives the output of first detector 504 for further processing. First focal point 511 in first FOV 518 corresponds to first focal point 411 in first FOV 418 (FIG. 4). A fourth angle of reflection of first detector 504 and a steering and a focusing pattern on receive PLM 514 provided by controller 501 determine a fourth angle of incidence of the first focal point 511 relative to receive PLM 514. In an example, the fourth angle of reflection is different from the first angle of incidence to allow positioning of first detector 504 in such a way that first light source 404 (FIG. 4) and first detector 504 do not interfere with each other. Selecting a steering and focusing pattern on receive PLM 514 as provided by controller 501 steers the focus of first reflected light beam 516 to first focal point 511 on object 550. The first focal point 511 of first reflected light beam 516 is the first focal point 411 to which first modulated light beam 416 (FIG. 4) is directed. As first modulated light 416 (FIG. 4) scans first FOV 418 (FIG. 4), the focus of first reflected light beam 516 scans the same points to which first modulated light 416 (FIG. 4) is directed. In this example, first detector 504 is an avalanche photo diode. If first detector 504 detects light from first light source 404 (FIG. 4) reflected from first focal point 511 of first reflected light beam 516, this detected light indicates that an object 550 is at that point. Scanning all of first FOV 518 determines the shape and position of object 550 that may be in first FOV 518. In examples, transmit PLM 414 (FIG. 4) and receive PLM 514 are the same PLM. However, because the pattern on PLM 414/514 in this example must both focus the transmit and receive light, an example using one, combined PLM requires positioning of the light sources and detectors in configurations that may not be practicable in certain situations. Using a separate PLM for the receive and transmit sections as in the example of FIGS. 4 and 5 allows for greater flexibility of positioning components of the LIDAR apparatus.

Receive PLM 514 and second receiving lens 522 focus second reflected light beam 526 reflected from object 550 at a second focal point 521 in second FOV 528 as second received light beam 520 to second detector 506. Controller 501 receives the output of second detector 506 for further processing. Second focal point 521 in second FOV 528 corresponds to second focal point 421 in second FOV 428 (FIG. 4). A fifth angle of reflection of second detector 506 relative to receive PLM 514 and the focusing pattern on receive PLM 514 determine a fifth angle of incidence of the second focal point 521 relative to receive PLM 514. In an example, the fifth angle of reflection is different from the second angle of incidence to allow positioning of first detector 506 in such a way that first light source 406 (FIG. 4) and first detector 506 do not interfere with each other. The second focal point 521 of second reflected light beam 526 is the second focal point 421 of second FOV 428 to which second modulated light beam 426 (FIG. 4) is directed. At any given time, the steering pattern on receive PLM 514 is constant. Therefore, the difference between the fifth angle of incidence and the fourth angle of incidence is determined by difference between the fifth angle of reflection and the fourth angle of refection. As with the fourth angle of reflection, the fifth angle of reflection of second detector 506 and the pattern on receive PLM 514 determines fifth angle of incidence. As second modulated light beam 426 (FIG. 4) scans second FOV 428, the second focal point 521 of second reflected light bean 526 scans the same second focal point 421 to which second modulated light beam 426 (FIG. 4) is directed. In this example, second detector 506 is an avalanche photo diode. If second detector 506 detects light from second light source 406 (FIG. 4) reflected from object 550 at the second focal point 521, this detected light indicates that object 550 is at that point. Scanning all of second FOV 528 determines the shape and position of an object that may be in second FOV 528.

Receive PLM 514 and third receiving lens 532 focus third reflected light beam 536 reflected from an object 550 at a third focal point 531 in third FOV 538 as third received light beam 530 to third detector 508. Controller 501 receives the output of third detector 508 for further processing. Third focal point 531 in third FOV 538 corresponds to third focal point 431 in third FOV 438 (FIG. 4). A sixth angle of incidence of third detector 508 and the steering and focusing pattern on receive PLM 514 provided by controller 501 determine a sixth angle of reflection of the third focal point 531 relative to receive PLM 514. In an example, the sixth angle of reflection is different from the third angle of incidence to allow positioning of third detector 508 in such a way that third light source 408 (FIG. 4) and third detector 508 do not interfere with each other. At any given time, the steering pattern on receive PLM 514 is constant. Therefore, the difference between the sixth angle of incidence and the fourth and fifth angles of incidence is determined by difference between the sixth angle of reflection and the fourth and fifth angles of reflection. As with the fourth and fifth angles of incidence, the angle of reflection of third detector 508 and the pattern on receive PLM 514 determine sixth angle of incidence. The third focal point 531 of third reflected light beam 536 is the third focal point 431 of third FOV 438 to which third modulated light beam 436 (FIG. 4) is directed. As third modulated light beam 436 (FIG. 4) scans third FOV 438, the third focal point 531 of first reflected light beam 516 scans the same third focal point 431 (FIG. 4) to which third modulated light beam 436 (FIG. 4) is directed. In this example, third detector 508 is an avalanche photo diode. If third detector 508 detects light from third light source 408 (FIG. 4) reflected from an object 550 at the third focal point 531, this detected light indicates that object 550 is at that point. Scanning all of third FOV 538 determines the shape and position of an object that may be in third FOV 538. In summary, example LIDAR apparatus 400 (FIG. 4) scans three fields of view contemporaneously. That is, the data rate of the PLM is reduced by the number of tiled FOVs. Thus, example LIDAR apparatus 400 (FIG. 4) scans the same area three times faster than a LIDAR apparatus using one light source/detector pair for a given PLM steering pattern loading rate. In addition, because each field of view scanned is a smaller portion of the overall field of view, limitations to the field of view size caused by limitations to the steering angle of the PLMs are overcome. In another example, the tiled FOVs can overlap to provide multiple data for each point and thus provide better coverage. In another example, the FOVs can be tiled in two dimensions. That is, fields of view can be on one plane or on multiple planes with respect to the LIDAR apparatus.

FIG. 5B is side view of receive portion 502 of example LIDAR apparatus 400. FIG. 5B is view 5B-5B of FIG. 5A looking across the face of receive PLM 514 from the direction of third detector 508. Third detector 508 blocks the view of first detector 504 and second detector 506 from this perspective. In addition, third receiving lens 532 blocks the view of first receiving lens 512 and second receiving lens 522. For simplicity, only third received light beam 530 and third reflected light beam 536 are shown in FIG. 5B. As shown in FIG. 5B, third received light beam 530 and third reflected light beam 536 are not in the same plane. In this example, this avoids interference of third detector 508 with third reflected light beam 536. A specific configuration of light sources is shown in this example vis-a-vis receive PLM 514. Other examples may use different configurations. In addition, other examples may use two, four or more detectors. In another example, the FOV or tiled FOVs as in the example of FIGS. 4 and 5, can be expanded by illuminating with a diverging laser beam. Examples of using divergent light beams are described in Makowski, et al., "Simple Holographic Projection in Color," Opt. Express 20, 22 (October 2012) and Maimone et al., "Holographic Near-Eye Displays for Virtual and Augmented Reality," ACM Transactions on Graphics, Vol. 36, No. 4, Article 85 (July 2017), which are hereby incorporated by reference herein in their entirety.

Figure 6:
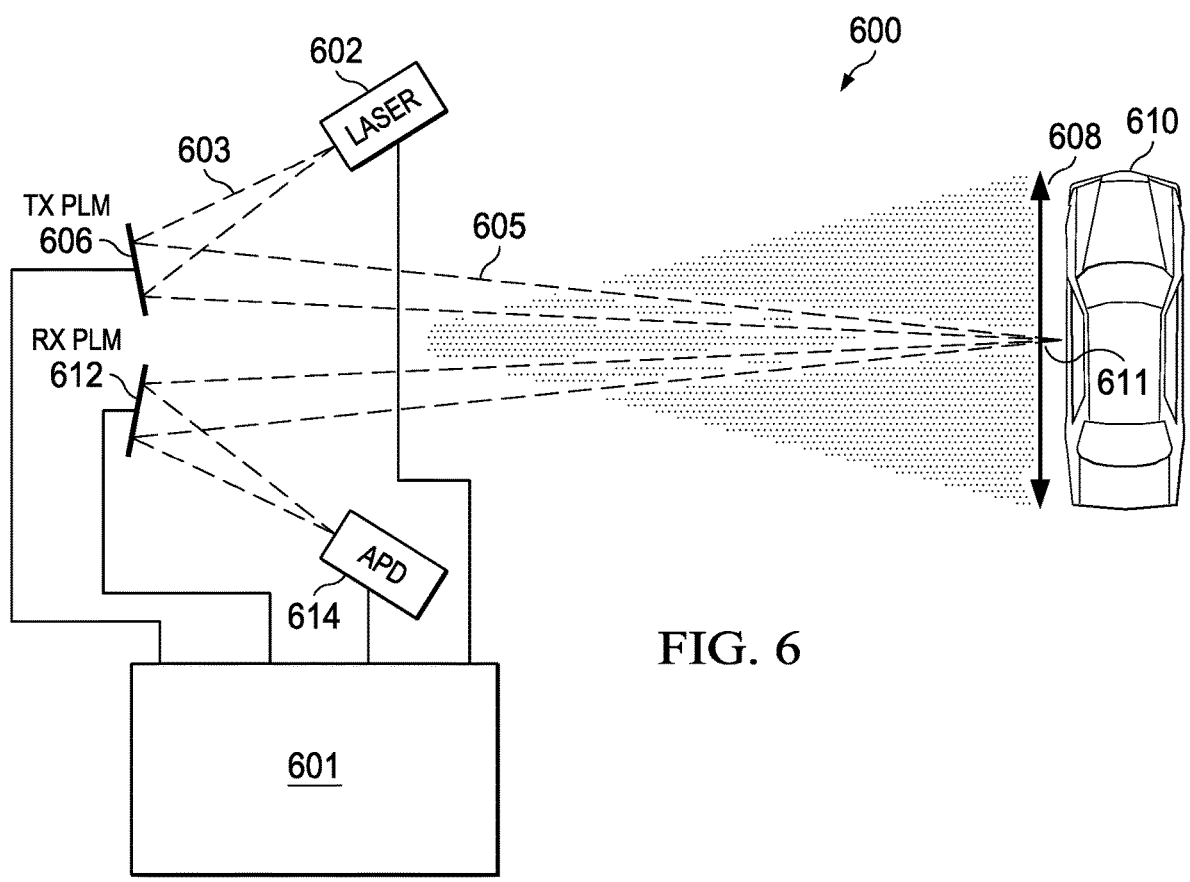
FIG. 6 is a diagram of another example LIDAR apparatus.

FIG. 6 is a diagram of another example LIDAR apparatus 600. Light source 602 is a laser in this example. In an example, light source 602 provides near infrared laser light. Light source 602 provides divergent light beam 603 to transmit PLM 606, which provides a modulated light beam 605 in response to the divergent light beam 603 output from light source 602. Rather than use a collimating lens as in the example of FIG. 3, transmit PLM 606 provides a configurable phase pattern to the light that both directs modulated light beam 605 to target 608 and provides an optical power or curvature that focuses the divergent light beam 603 from light source 602 to focus on focal point 611. Thus, by using a phase pattern with an optical power to focus divergent light from light source 602, example LIDAR apparatus 600 eliminates the additional expense and manufacturing complication of using a collimating lens. In the example of FIG. 6, focal point 611 is on the surface of an object 610, which is an automobile. Receive PLM 612 includes a pattern that focuses light reflected from object 610 at the focal point 611 onto detector 614. In this example, the pattern on receive PLM 612 includes both a steering function and an optical power or curvature that focuses the light directly onto detector 614. Thus, an additional lens that focuses and "de-collimates" light from focal point 611 on to detector 614 is not necessary. Transmit PLM 606 and receive PLM 612 are a digital micromirror based PLM in this example. In other examples, either or both of transmit PLM 606 and receive PLM 612 are reflective or transmissive liquid crystal phase light modulators. Controller 601 controls the patterns on transmit PLM 606 and receive PLM 612, and controls the light provided by light source 602 and receives the detected light signal from detector 614. Because controller 601 knows the point at which transmit PLM 606 directs the light from light source 602, detection of reflected light by detector 614 indicates that an object is at that point. In this example, detector 614 is an avalanche photo diode. Transmit PLM 606 scans the field of view while receive PLM 612 is adjusted to focus on the focal point 611 to which transmit PLM 606 is scanning. This allows example LIDAR apparatus 600 to determine the distance and contour of object 610. In another example, with a configuration using multiple light sources and detectors like that of FIGS. 4 and 5, the light sources can provide divergent light and the PLMs can provide an optical power as with the example of FIG. 6, thus eliminating the need for collimating lenses at the output of the light sources and focusing lenses at the input of the detectors.

Figure 7:
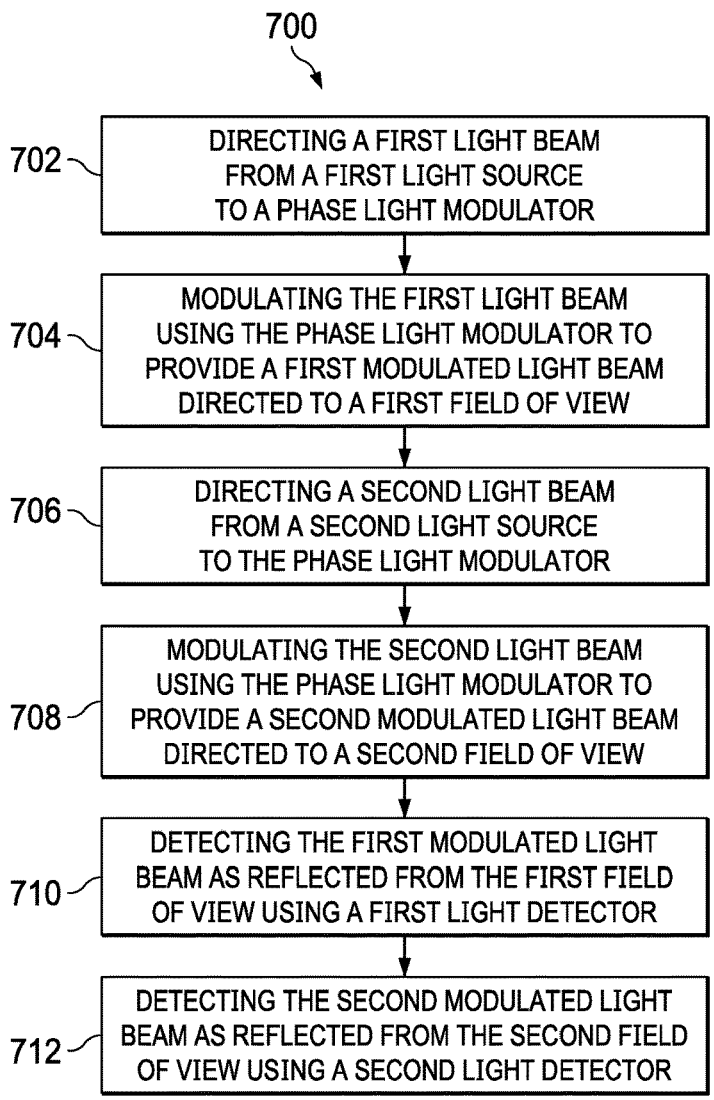
FIG. 7 is a flow diagram of an example method.

FIG. 7 is a flow diagram of an example method 700. Step 702 is directing a first light beam from a first light source to a first input of a phase light modulator. A light source such as first light source 404 (FIG. 4) provides the first light beam. The phase light modulator is like transmit PLM 414 (FIG. 4). Step 704 is modulating the first light beam using the phase light modulator to provide a first modulated light beam directed to a first field of view. The first modulated light beam is like modulated first modulated light beam 416 (FIG. 4). The first field of view is like first FOV 418 (FIG. 4). Step 706 is directing a second light beam from a second light source to the phase light modulator. A light source such as second light source 406 (FIG. 4) provides the second light beam. Step 708 is modulating the second light beam using the phase light modulator to provide a second modulated light beam directed to a second field of view. The second modulated light beam is like second modulated light beam 426 (FIG. 4). The second field of view is like second FOV 428 (FIG. 4). Step 710 is detecting the first light beam as reflected from the first field of view using a first light detector. The first light detector is like first detector 504 (FIG. 5). Step 712 is detecting the second light beam as reflected from the second field of view using a second light detector. The second light detector is light second detector 506 (FIG. 5).

Figure 8:
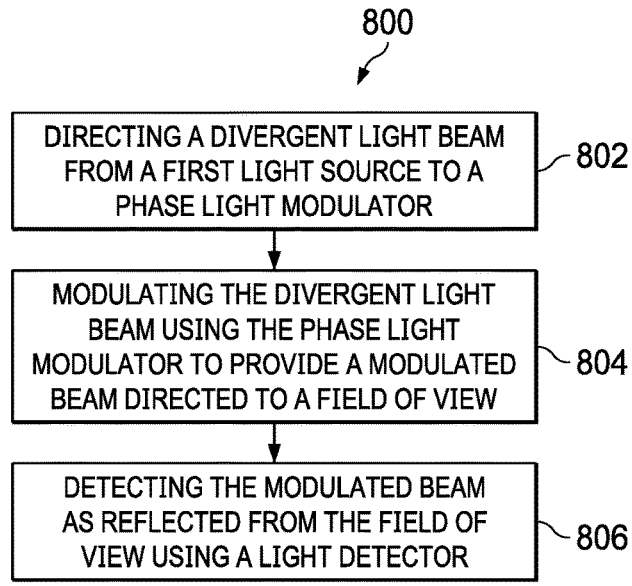
FIG. 8 is a flow diagram of another example method.

FIG. 8 is a flow diagram of another example method 800. Step 802 is directing a divergent light beam from a light source to a phase light modulator. The divergent light source is like light source 602 (FIG. 6). The phase light modulator is like transmit PLM 606. Step 804 is modulating the divergent light beam using the phase light modulator to provide a modulated output beam directed to a field of view. The field of view is like target 608 (FIG. 6). Step 806 is detecting the light modulated output as reflected from the field of view using a light detector. The light detector is like detector 614 (FIG. 6).

Modifications are possible in the described examples, and other examples are possible, within the scope of the claims.

What is claimed is:

1. An apparatus comprising:
   a phase light modulator;
   a first light source optically coupled to the phase light modulator, the first light source configured to generate a first light beam and positioned to direct the first light beam towards the phase light modulator at a first angle of incidence, the phase light modulator configured to modulate the first light beam to provide a first modulated light beam and to direct the first modulated light beam towards a first field of view responsive to the first light beam;
   a second light source optically coupled to the phase light modulator, the second light source configured to generate a second light beam and positioned to direct the second light beam towards the phase light modulator at a second angle of incidence, the phase light modulator configured modulate the second light beam to provide a second modulated light beam and to direct the second modulated light beam towards a second field of view responsive to the second light beam;
   a first light detector configured to receive a reflection of the first modulated light beam from the first field of view; and
   a second light detector configured to detect a reflection of the second modulated light beam from the second field of view.

2. The apparatus of claim 1, wherein the phase light modulator is a first phase light modulator, and the apparatus further comprising a second phase light modulator, the second phase light modulator configured to direct the reflection of the first modulated light beam reflected from the first field of view towards the first light detector and to direct the reflection of the second modulated light beam reflected from the second field of view towards the second light detector.

3. The apparatus of claim 2, wherein a first angle of reflection from the second phase light modulator to the first light detector is different from the first angle of incidence, and wherein a second angle of reflection from the second phase light modulator to the second light detector is different from the second angle of incidence.

4. The apparatus of claim 1, wherein the phase light modulator is configured to modulate the first light beam with a steering pattern to provide the first modulated light beam and to modulate the second light beam with the steering pattern to provide the second modulated light beam.

5. The apparatus of claim 4, further comprising a controller configured to control the steering pattern on the phase light modulator such that the first modulated light beam scans the first field of view and the second modulated light beam scans the second field of view.

6. The apparatus of claim 1, wherein the phase light modulator comprises an array of digital micromirrors, and wherein the phase light modulator is configured to modulate the first light beam and the second light beam by setting a height of the digital micromirrors above a substrate of the phase light modulator.

7. The apparatus of claim 1, further comprising a first collimating lens optically coupled between the first light source and the phase light modulator and a second collimating lens optically coupled between the second light source and the phase light modulator.

8. A method comprising:
directing a first light beam from a first light source towards a phase light modulator;
modulating the first light beam by the phase light modulator to provide a first modulated light beam directed towards a first field of view;
directing a second light beam from a second light source towards the phase light modulator;
modulating the second light beam by the phase light modulator to provide a second modulated light beam directed towards a second field of view;
detecting a reflection of the first modulated light beam from the first field of view by a first light detector; and
detecting a reflection of the second modulated light beam from the second field of view by a second light detector.

9. The method of claim 8, wherein the phase light modulator modulates the first light beam with a steering pattern to provide the first modulated light beam and the phase light modulator modulates the second light beam with the steering pattern to provide the second modulated light beam.

10. The method of claim 9, further comprising controlling the steering pattern on the phase light modulator such that the first modulated light beam scans the first field of view and the second modulated light beam scans the second field of view.

11. The method of claim 8, wherein the phase light modulator comprises:
an array of digital micromirrors, and the phase light modulator modulates the first light beam and the second light beam by setting a height of the digital micromirrors above a substrate of the phase light modulator; or
a liquid crystal phase light modulator, and wherein the phase light modulator modulates the first light beam and the second light beam by applying a voltage to a liquid crystal at each pixel.

12. The apparatus of claim 1, wherein the phase light modulator comprises a liquid crystal phase light modulator, wherein the phase light modulator modulates the first light beam and the second light beam by applying a voltage to a liquid crystal at pixels of the liquid crystal phase light modulator.

13. The apparatus of claim 1, further comprising a gap between the first field of view and the second field of view.

14. The apparatus of claim 1, wherein the first field of view overlaps the second field of view.

15. The apparatus of claim 1, further comprising:
a third light source optically coupled to the phase light modulator, the third light source configured to generate a third light beam and positioned to direct the third light beam towards the phase light modulator at a third angle of incidence, the phase light modulator configured modulate the third light beam to provide a third modulated light beam and to direct the third modulated light beam towards a third field of view responsive to the third light beam, the first field of view at a first side of the second field of view and the third field of view at a second side of the second field of view opposite the first side; and
a third light detector configured to receive a reflection of the third modulated light beam from the third field of view.

16. A vehicle comprising:
a light detection and ranging (LIDAR) system comprising:
a phase light modulator;
a first light source optically coupled to the phase light modulator, the first light source configured to produce a first light beam and positioned to direct the first light beam towards the phase light modulator at a first angle of incidence, the phase light modulator configured to modulate the first light beam to provide a first modulated light beam and to direct the first modulated light beam towards a first field of view responsive to the first light beam;
a second light source optically coupled to the phase light modulator, the second light source configured to generate a second light beam and positioned to direct the second light beam towards the phase light modulator at a second angle of incidence, the phase light modulator configured modulate the second light beam to provide a second modulated light beam and to direct the second modulated light beam towards a second field of view responsive to the second light beam;
a first light detector configured to receive a reflection of the first modulated light beam from the first field of view; and
a second light detector configured to detect a reflection of the second modulated light beam from the second field of view.

17. The apparatus of claim 16, further comprising a gap between the first field of view and the second field of view.

18. The vehicle of claim 16, wherein the first field of view overlaps the second field of view.

19. The vehicle of claim 16, further comprising:
a first collimating lens optically coupled between the first light source and the phase light modulator; and
a second collimating lens optically coupled between the second light source and the phase light modulator.

20. A system comprising:
a phase light modulator;
a first light source optically coupled to the phase light modulator;
a second light source optically coupled to the phase light modulator;
a controller coupled to the phase light modulator, to the first light source, and to the second light source, the controller configured to instruct the first light source to produce a first light beam, instruct the second light source to produce a second light beam, and instruct the phase light modulator to:
modulate the first light beam to produce a first modulated light beam and direct the first modulated light beam towards a first field of view, the first light beam received by the phase light modulator at a first angle; and
modulate the second light beam to produce a second modulated light beam and direct the second modulated light beam towards a second field of view, the second light beam received by the phase light modulator at a second angle;
a first light detector configured to receive a reflection of the first modulated light beam from the first field of view; and
a second light detector configured to detect a reflection of the second modulated light beam from the second field of view.

21. The apparatus of claim 20, further comprising a gap between the first field of view and the second field of view.

22. The system of claim 20, wherein the first field of view overlaps the second field of view.

* * * * *